(No Model.) 2 Sheets—Sheet 1.
J. A. ELLIOTT.
NURSERY AND LAWN CAR.
No. 463,891. Patented Nov. 24, 1891.
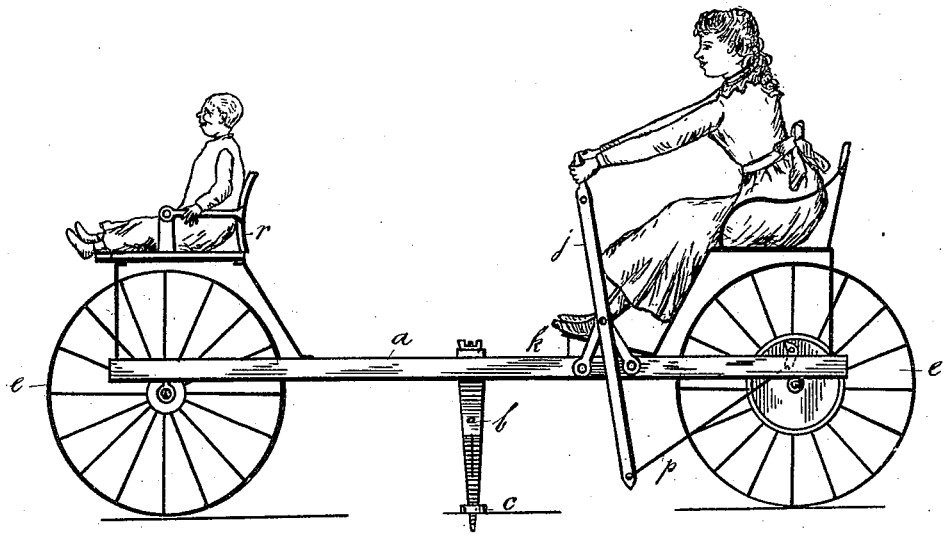
Fig. I.
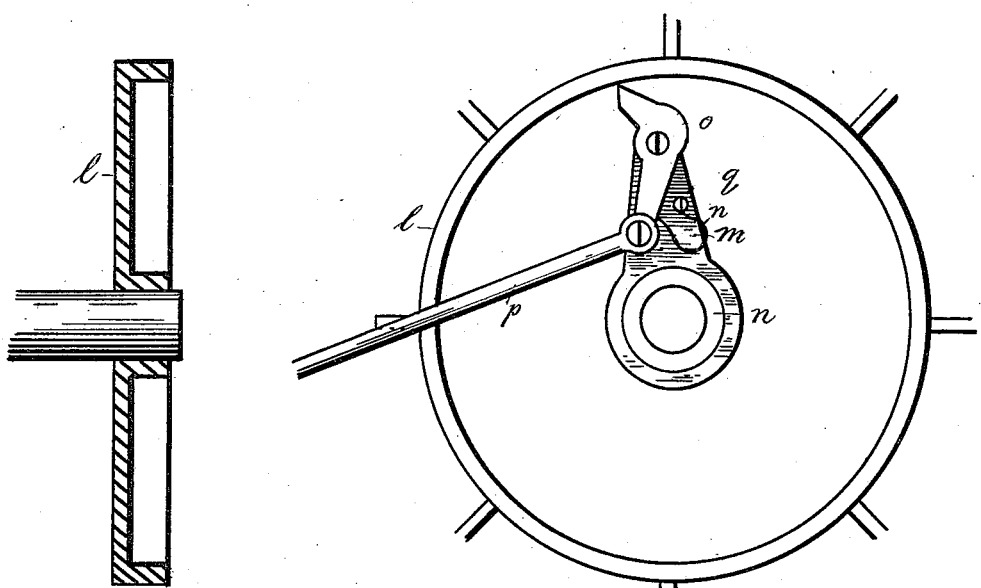
Fig. IV.   Fig. III.
Witnesses,   Inventor,
R. S. Millar   Judson A. Elliott
A. G. Strack.   By J. B. Bailey Atty

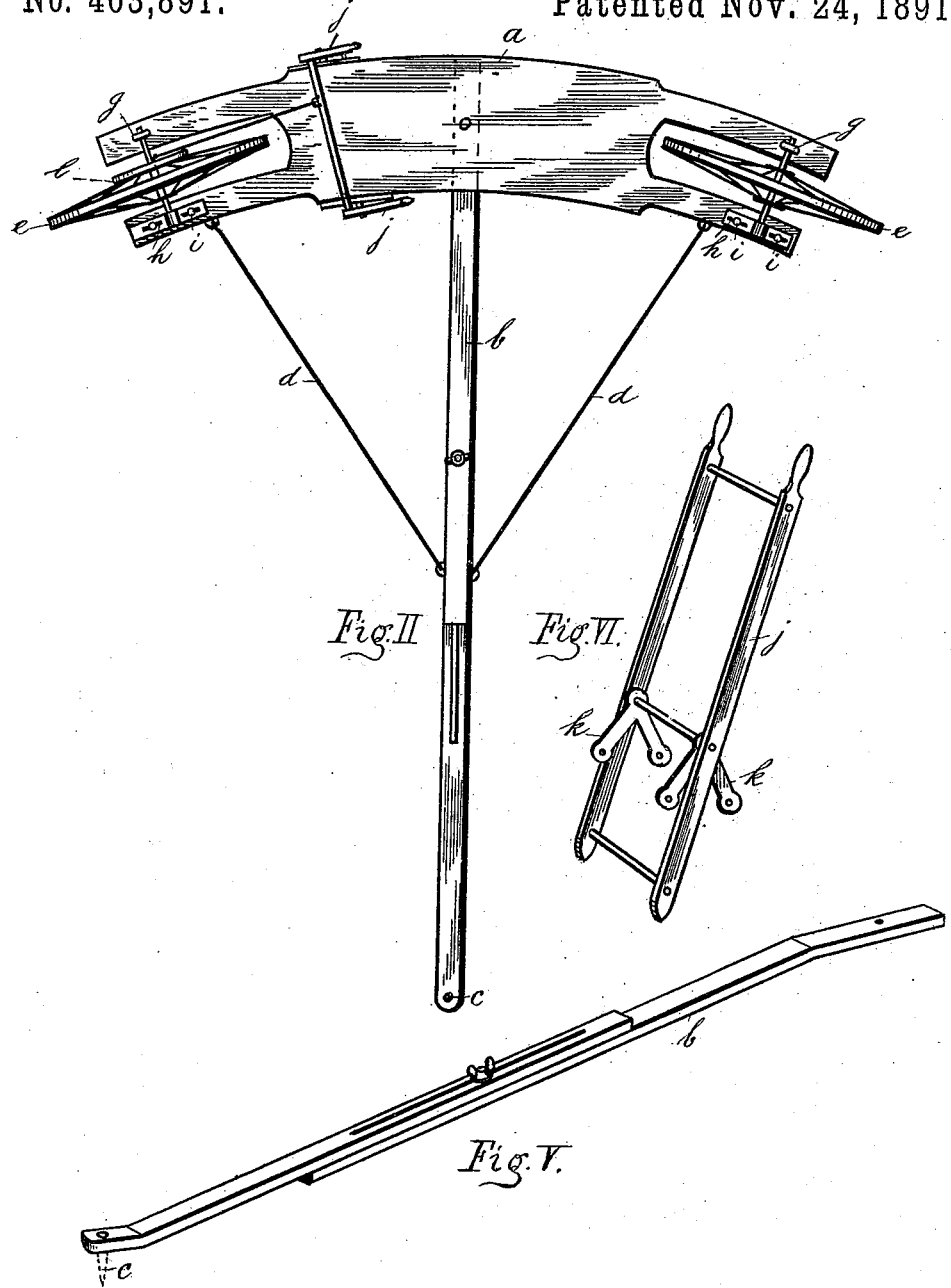

United States Patent Office.

JUDSON A. ELLIOTT, OF CINCINNATI, OHIO.

NURSERY AND LAWN CAR.

SPECIFICATION forming part of Letters Patent No. 463,891, dated November 24, 1891.

Application filed June 27, 1891. Serial No. 397,754. (No model.)

*To all whom it may concern:*

Be it known that I, JUDSON A. ELLIOTT, of Cincinnati, in the county of Hamilton and State of Ohio, have invented a new and useful Improvement in Nursery and Lawn Cars, which improvement is fully set forth in the following specification and accompanying drawings, in which—

Figure I is a side elevation of my improved nursery and lawn car; Fig. II, a bottom plan view of the same; Fig. III, a detail view of the friction-clutch; Fig. IV, a central vertical section of the clutch-disk; Fig. V, a detail view of the extensible radial arm, and Fig. VI a detail view of the operating-lever.

My invention relates to improved appliances for providing enjoyment and recreation for young children; and its object is the construction of a simple, appropriate, and durable device adapted for both in and out door use, available at all seasons of the year, and designed to supply the demand for a safe and attractive source of amusement, as well as a healthful and invigorating physical exercise.

Referring to the accompanying drawings, $a$ designates the platform of my nursery and lawn car. An extensible radial arm $b$ has its outer end bolted to the upper side of the platform and its inner end journaled on a pivot $c$, which is suitably attached to a central point in the floor of a nursery or other indoor apartment, or to the earth whenever the car is operated on a lawn. Diagonal stays $d$ extend from the arm to the end of the platform and hold the parts securely in their relative positions. The ends of the platform are slotted to admit the wheels $e$, which are preferably provided with rubber tires. The outer ends of their axles rotate in eyebolts $g$, while their inner ends engage journal-bearings provided with slots $h$ and fastened to the platform by screws $i$. By this means the wheels may be readily adjusted in proper relative position to their circuit whenever it is enlarged or diminished by lengthening or shortening the radial arm $b$. The car is propelled by a lever $j$, pivoted on struts $k$, attached to the sides of the platform. A disk $l$, having a recessed face, is suitably attached to the side of one of the wheels and contains a friction-clutch consisting of an arm $m$, which rotates on a sleeve $n$, having a dog $o$ pivoted thereon and a connecting-rod $p$ extending to the lever $j$. A curved spring $q$ holds the dog out of engagement with the disk during the backward movements of the lever. If preferred, a ratchet-wheel and pawl may be substituted for the friction-clutch. The radial arm is so formed as to cause the car to incline slightly inward from the perpendicular, and thereby counteract the effect of the centrifugal force of the car while traveling in its circuit. A reversible seat $r$ is attached to one end of the platform, so that the occupant may ride facing the front, if desired. This seat is specially designed for young children and may be made sufficiently wide to accommodate two.

The advantages of the device will be apparent. It will be observed that by means of the extensible radial arm in connection with the adjustable journal-bearings for the axles the car may be readily adapted to an apartment of any size, and when used on the lawn the circuit may be enlarged to any desired extent.

What I claim as new is—

The herein-described nursery and lawn car, comprising a platform mounted upon fore and aft wheels adapted to travel in a circular plane, the movable axle-bearings whereby the wheels are adjusted in relation to a common center in the plane of their movement, and the extensible radial arm pivoted on the said common center and extending therefrom to the platform, in combination with the friction-clutch and the propelling-lever, substantially as herein set forth.

In testimony that I claim the foregoing I have hereunto set my hand this 23d day of June, 1891, in the presence of two witnesses.

JUDSON A. ELLIOTT.

Witnesses:
R. S. MILLAR,
L. M. ADAMS.